United States Patent
Shiitani et al.

[11] Patent Number: 6,097,840
[45] Date of Patent: *Aug. 1, 2000

[54] PROFILE EXTRACTING METHOD AND SYSTEM

[75] Inventors: Shuichi Shiitani; Masaki Watanabe, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/705,853

[22] Filed: Aug. 28, 1996

[30] Foreign Application Priority Data

Mar. 29, 1996 [JP] Japan ................................. 8-077600

[51] Int. Cl.$^7$ ........................................... G06K 9/46
[52] U.S. Cl. .......................... 382/203; 382/282; 345/419; 345/433
[58] Field of Search ........................... 382/181, 190, 382/192, 193, 194, 199, 209, 243, 201–205, 215–219, 266, 269, 283, 282; 395/118, 119, 121, 125; 345/421, 425, 419, 433, 434

[56] References Cited

U.S. PATENT DOCUMENTS

| | | | |
|---|---|---|---|
| 4,110,736 | 8/1978 | Kono | 382/202 |
| 4,475,122 | 10/1984 | Green | 382/151 |
| 4,618,989 | 10/1986 | Tsukune et al. | 382/203 |
| 4,783,829 | 11/1988 | Miyakawa et al. | 382/199 |
| 4,969,201 | 11/1990 | Takasaki et al. | 382/199 |
| 5,048,099 | 9/1991 | Lee | 382/282 |
| 5,471,535 | 11/1995 | Ikezawa et al. | 382/199 |
| 5,479,535 | 12/1995 | Komatsu | 382/199 |
| 5,546,476 | 8/1996 | Mitaka et al. | 382/201 |
| 5,621,827 | 4/1997 | Uchiyama et al. | 382/190 |
| 5,680,471 | 10/1997 | Kanebako et al. | 382/132 |
| 5,694,532 | 12/1997 | Carey et al. | 395/119 |

*Primary Examiner*—Jon Chang
*Attorney, Agent, or Firm*—Staas & Halsey LLP

[57] ABSTRACT

To identify the shape of an object on the basis of a two-dimensional image including the image of the object, an image of notice is extracted from the two-dimensioinal image as a part thereof and including the profile of the object, and on the basis of the image information of the extracted image of notice, the image division line, being the line of specific line kind defined by function, substantially matching with the profile of the object in the image of notice is assessed.

15 Claims, 12 Drawing Sheets

FIG. 7
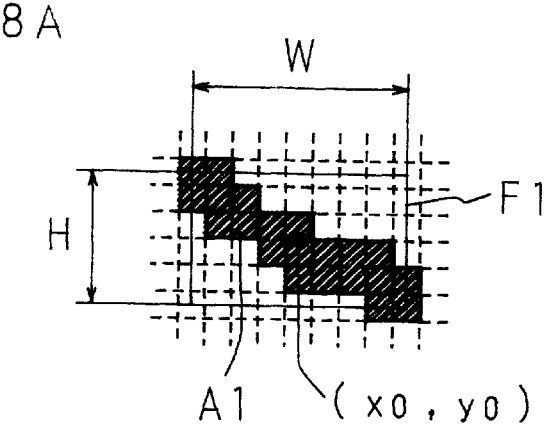
FIG. 8A
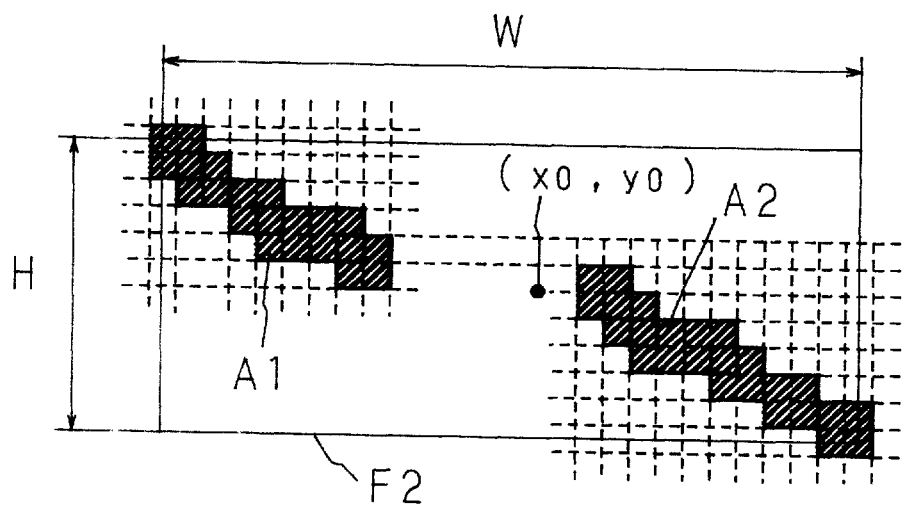
FIG. 8B

PROFILE EXTRACTING METHOD AND SYSTEM

BACKGROUND OF THE INVENTION

1. Field of the Invention

The present invention relates to a profile extracting method and system for identifying a shape of an object from a two-dimensional image having shape information of the object, preferably usable in modeling of a three-dimensional shape of the object.

2. Description of the Related Art

Using a photograph of an existing object, modeling for specifying the shape of the object is executed. Disposing a photograph and a primitive in a virtual space, the primitive is moved or deformed so that the projected image oil the photographic plane may coincide with the object image in the photograph. It is preferred for the job efficiency to set up a modeling system in which the user is responsible for rough modeling and the system is responsible for fine adjustment. For fine adjustment, the outline profile of the object must be extracted from the photograph as accurately as possible.

In image analysis by computer, when recognizing the shape of an object expressed by an image, according to a general method, the edge in the image (the portion of evident change of pixel value) is detected, and detected edges are linked to extract the profile of the object. The edge is detected by calculating the edge intensity of pixel by applying a local operator as represented by differential type to the pixel. Usually, to decrease the effects of noise components of the image, the pixel of which edge intensity exceeds a predetermined threshold is detected as edge.

Hitherto, being susceptible to effects of noise components, for example, even if the actual profile is composed of a set of lines such as straight line and arcs that can be expressed by simple numerical formula, the extracted profile was often composed of complicated lines. Or the extracted profile of object was a line (curve or straight line) precisely conforming to the edge distribution. Accordingly, the shape of the object cannot be identified correctly if the object to be extracted and other object are partly overlapped in the image, that is, if the profile to be extracted and profile of other object are continuous.

SUMMARY OF THE INVENTION

It is a primary object of the invention to provide a profile extracting method and system capable of enhancing the precision of identification of shape of an object on the basis of a two-dimensional image.

It is another object of the invention to provide a profile extracting method and system capable of realizing an accurate modeling of high job efficiency when generating a shape model.

If the line kind of profile of an object is known beforehand, by fitting the line of the known line kind to the edge of two-dimensioinal image, the profile can be extracted efficiently and accurately. In this specification, the "line kind" refers to the geometrically (mathematically) classified kind, such as straight line, circular curve, elliptical curve, and parabola. The term "profile" refers to the line expressing the shape of an object. For example, when the object is a polyhedral body, each edge (side) is a profile.

Paying attention to the portion containing the profile, not the entire two-dimensional image, effects of noise components may be avoided. As the point of notice, a portion of a clear profile is preferred. It is preferred from the viewpoint of practical benefit to set up a system in which the user of the system specifies the point of notice.

According to the method of the invention, from the two-dimensional image containing the image of the object, the image of notice is extracted as part and including the profile of the object, and on the basis of the image information of the extracted image of notice, the line of the specific line kind defined by the function, being the image division line substantially matching with the profile of the object in the image of notice is assessed. In the system in which the computer extracts the profile by analyzing the two-dimensional image, the image of notice and the line kind of the image division line is specified by the user of the system.

Also in this method, setting plural provisional image division lines differing in parameter, the value of index for qualification in each provisional image divisional line is investigated, and the provisional image division line of which index value is closest to the optimum value is assessed as the matching image division line.

Moreover, the provisional image division line is set according to the assessment reference information showing the extension direction of the profile. The assessment reference information is given by the user to the system. In this way, assessment of image division line is very efficient.

Furthermore, as the image of notice, a set of mutually separate plural partial images is extracted. In this way, the image information quantity used in assessment of image division line is increased, so that the shape of the object can be identified more accurately.

To the image information of each pixel composing the image of notice, a greater weight is applied if the position of pixel is closer to the center of the image of notice. It is effective to alleviate the effects of noise components and enhance the precision of assessment of the image division line.

Still more, the image division line is a projected image of a curve model to a two-dimensioinal image when the two-dimensional image and curve model are disposed ill a virtual three-dimensional space. In this way, designation of line kind of a complicated image division line can be simplified.

The above and further objects and features of the a invention will more fully be apparent from the following detailed description with accompanying drawings.

BRIEF DESCRIPTION OF THE DRAWINGS

FIG. 7 is a composition diagram of operator applied in calculation of edge intensity;

FIGS. 8A and 8B are diagrams for explaining the definition of weighting of pixels of image of notice;

DESCRIPTION OF THE PREFERRED EMBODIMENTS

Figure 1:
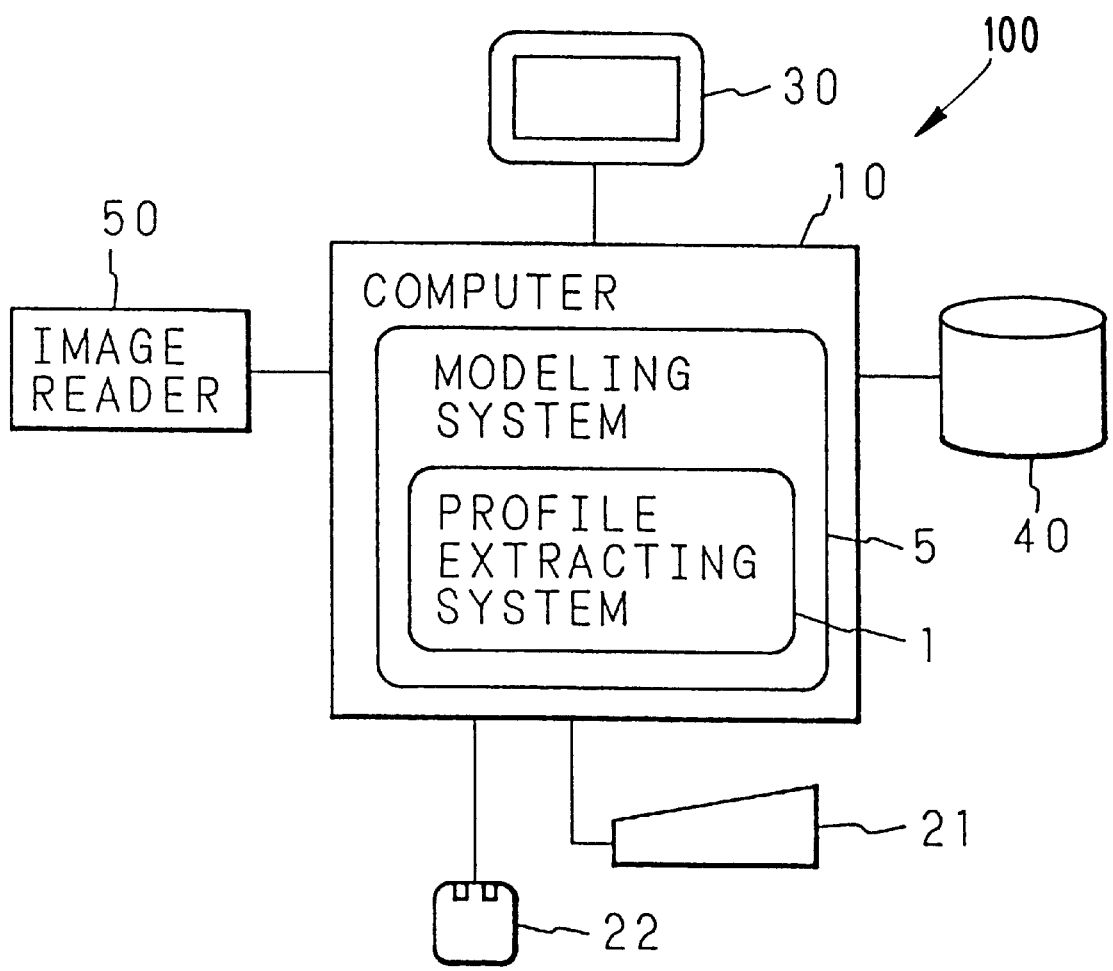
FIG. 1 is a diagram showing hardware relating to modeling according to the invention.

Referring now to the drawings, embodiments of the invention are described in detail below.

FIG. 1 is a diagram showing hardware relating to modeling according to the invention. The interactive type modeling requires a computer system CS 100 having a man machine interface. The illustrated computer system CS 100 has a computer 10 incorporating a graphic circuit device, a keyboard 21, a mouse 22, a display 30, all auxiliary memory device 40, and an image reader 50 for inputting two-dimensional image information. The computer 10 has software for realizing the function of modeling system 5. This modeling system 5 contains a profile extracting system 1 for assessing the line (image division line) to be overlapped with the profile of the object in the two-dimensioinal image as sub-system, and a wire frame model having peaks at intersections of the lines assessed by the profile extracting system 1 is created.

Instead of the mouse 22, a track ball or other pointing device may be used. Or, instead of the image reader 50, a video camera may be used to input, the object image to the computer 10. Additionally, a recording medium such as an optical disk may be used to supply an image to the computer 10.

Figure 2:
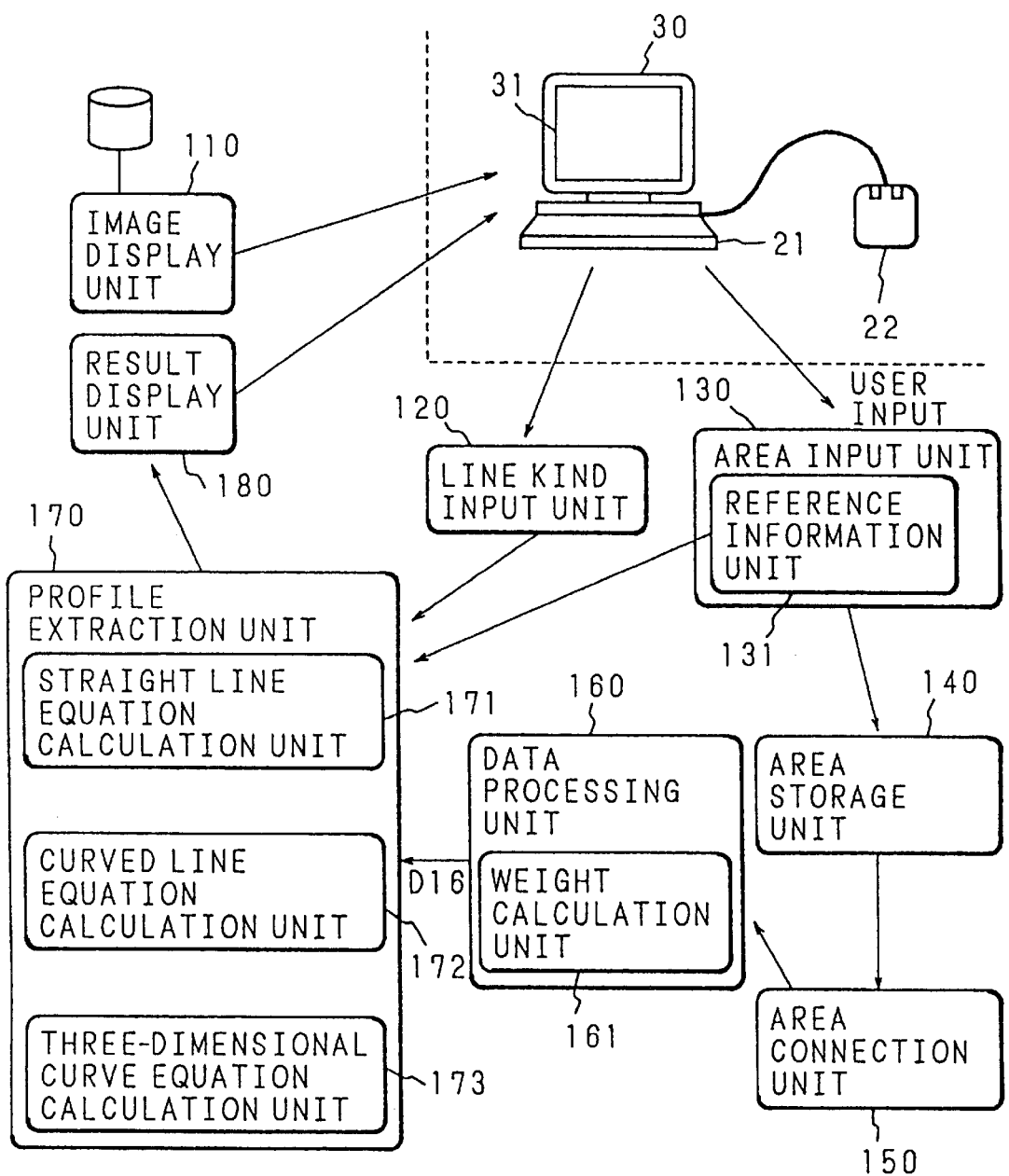
FIG. 2 is a functional block diagram of profile extracting system.

FIG. 2 is a functional block diagram of the profile extracting system 1. The profile extracting system 1 has an image display unit 110, a line kind input unit 120, an area input unit 130, an area storage unit 140, an area connection unit 150, a data processing unit 160, a profile extraction unit 170, and a result display unit 180.

The image display unit 110 shows only a screen 31 of the display 30 one image (this is called the original image) selected by the user from plural two-dimensional images stored under the control of the modeling system 5. The original image contains the image of the object to be modeled. The line kind input unit 120 transmits the line kind of the image division line specified by the user to the profile extraction unit 170. Plural line kinds (straight line, curve line) are registered preliminary in this system. The user selects the line kind conforming to the object.

The area input unit 130 receives the area specification by the user, and transmits the specified region to the area storage unit 140 as the image of notice. The image of notice is part of the original image on the screen 31. The user specifies, as the image of notice, the portion of particularly clear profile of the object in the original image, that is, the portion of fewer noise components that may disturb judgement of the profile. At this time, mutually separate plural areas can be specified. In the area input unit 130, there is a reference information unit 131 for transmitting the user specified information for enhancing the efficiency of assessment of the image division line corresponding to the profile extraction to the profile extraction unit 170. The user specified information includes an approximate inclination (in the case of a straight line) of image division line, and position of passing point, among others.

The area specified by the user is once stored in the area storage unit 140. When plural areas are specified, their union is transmitted to the data processing unit 160 as one image of notice corresponding to one image division line by the area connection unit 150. The data processing unit 160 has a weight calculation unit 161 for weighting each pixel for composing the image of notice according to the position, and image data of notice D16 is created for automatic extraction of profile on the basis of the data value (pixel value) of each pixel of the image of notice.

The profile extraction unit 170 assesses the image division line for matching with the profile of the object indicated by the image of notice on the basis of the image data of notice D16 from the data processing unit 160. In other words, so as to overlap with the profile of the object on the screen 31, the image division line of the specified line kind is assigned. Depending only the line kind, a numerical expression is deduced so that any one of straight line equation calculation unit 171, curved line equation calculation unit 172, and three-dimensional curve equation calculation unit 173 may specify the image division line definitely. Herein, the three-dimensional curve equation calculation unit 173 is responsible for assessment in the case of definition of the line kind in a format of projection of three-dimensional pattern on a two-dimensional plane.

The result display unit 180 displays by overlapping the original image and the image division line assessed by the profile extraction unit 170. Strictly speaking, the data for display is created. The user observes the display, and judges the qualification of the image division line.

A practical example of profile extraction is described below.

Figure 3:
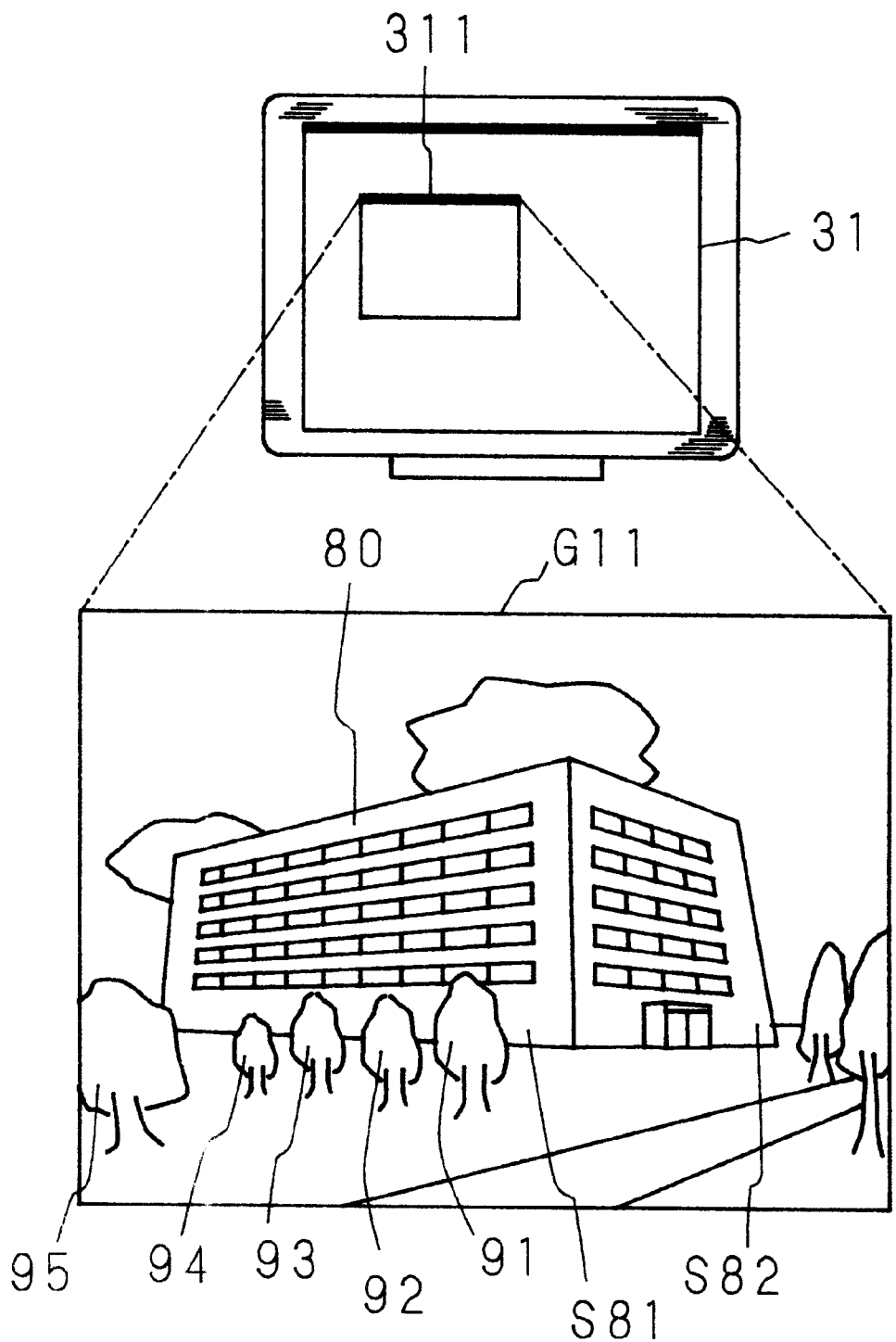
FIG. 3 is a diagram showing display form and content of image.

FIG. 3 is a diagram showing the content and display format of the original image G11. The image display unit 110 has a window 311 provided in the screen 31, and displays the original image G11 specified by the user. The size of the window 311 is selected according to the size of the original image G11. The original image 11 is a scenic photograph taking a nearly rectangular parallelepiped building 80 which is the subject of modeling, and has appearance information of two sides S81, S82 of the building 80. Of the two sides, however, the horizontally long side S81 is partly concealed by the street trees 91 to 95.

In the display state of the original image G11, when the user instructs listing display of primitives (basic models) of modeling, another window (not shown) than the window 311 is provided, and the plural registered primitives are graphically displayed. The user selects a desired primitive by, for example, click operation of the mouse 22.

FIG. 4 is a diagram showing a modeling process. To avoid complication of drawing, in FIG. 1, the original image G11 is simplified. It is same in the following drawings.

Figure 4A:
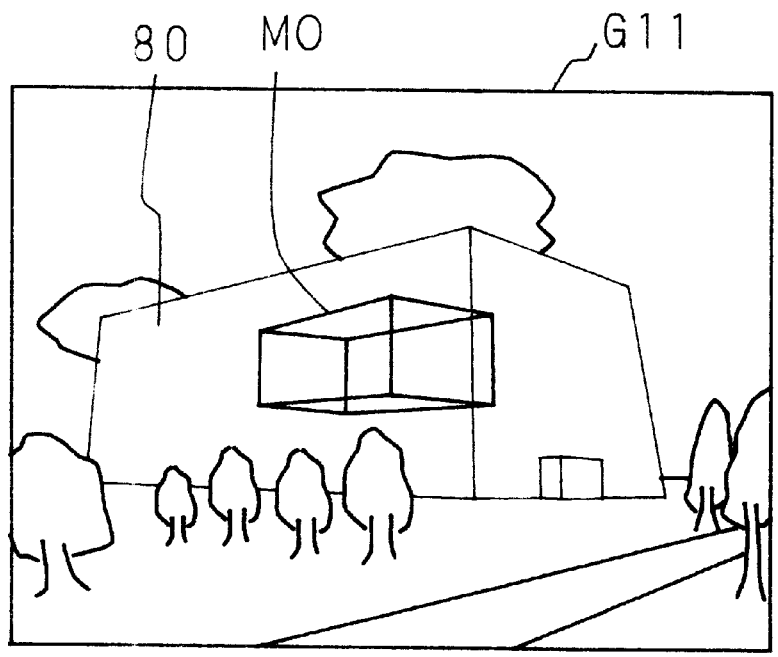
FIGS. 4A and 4B are diagrams showing the process of modeling.
Figure 4B:
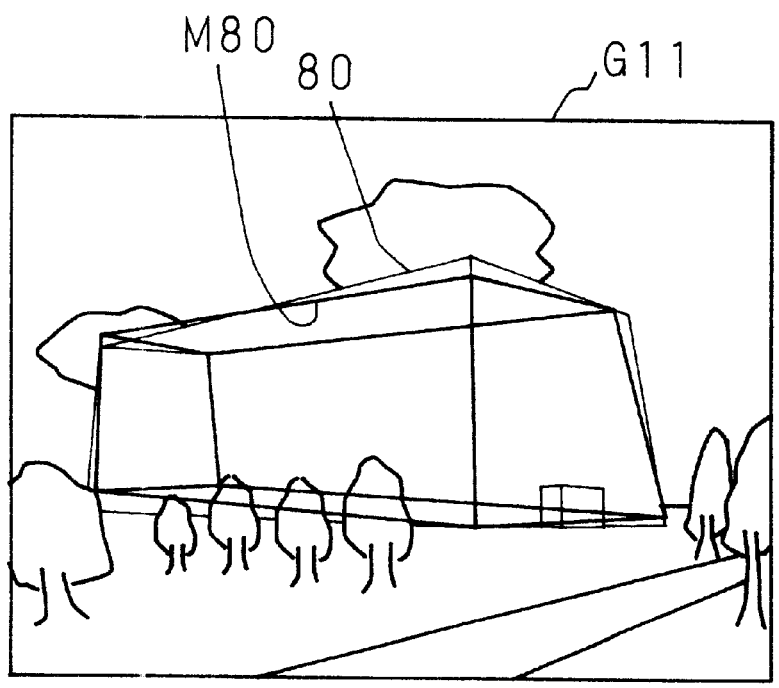

When the user select the primitive (in this case, a rectangular parallelepiped), as shown in FIG. 4A, the primitive is displayed in a wire frame format as prototype model MO, overlapping with the original image G11. The displayed wire frame is a projected image of the primitive onto the original image G11 when the original image G11 and primitive are disposed in a virtual space. The user modifies the prototype model MO by operating to move, expand, contract or rotate, and creates a model M80 nearly coinciding with the building 80 as shown in FIG. 4B. At this time, as required, for the ease of understanding of the disposition state of the model, a wire frame model of spheres (guide polygon) may be displayed.

Figure 5:
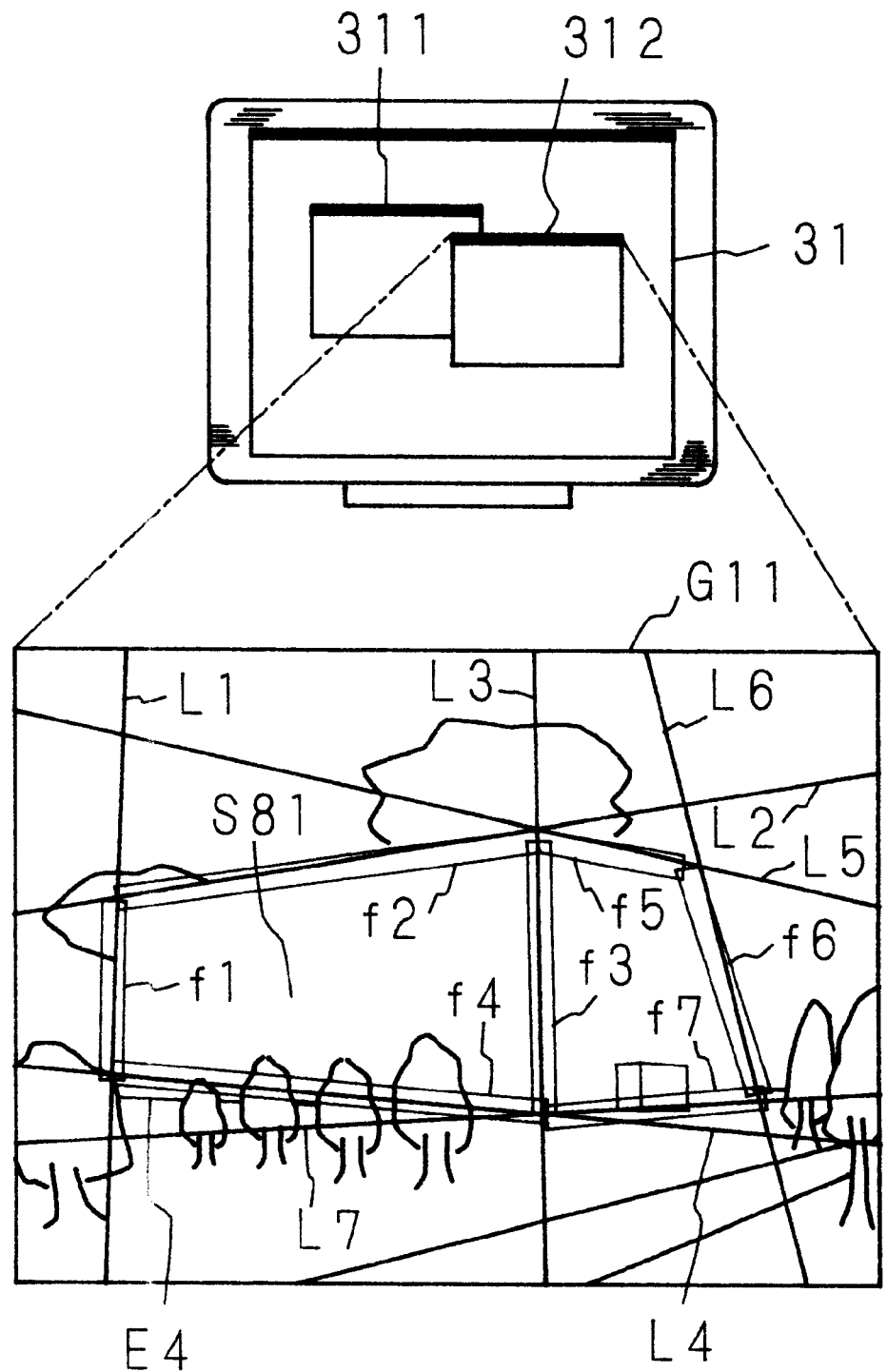
FIG. 5 is a diagram showing the result of profile extraction by automatic region setting.

FIG. 5 is a diagram showing the result of profile extraction by automatic area setting. As mentioned above, when the user instructs automatic model modification after creating model M80 by manual operation, the modeling system 5 analyzes the original image G11, extracts the profile (in this case, ridge line) of the building 80, and assesses the image division lines L1 to L7 matching with the extracted profile, and displays in the window 312. At this time, band areas f1 to f7 of predetermined width having the center in each side of the model M80 are set automatically, and the profile is extracted according to the image information of the band areas f1 to f7. That is, by edge detection near each side of the model M80, the boundary of the building 80 and background is judged, and the image division lines LI to L7 matching with the boundary are found out. Since the model M80 is a rectangular parallelepiped, the image division lines L1 to L7 in this case are straight lines. Actually, the image division lines L1 to L7 are displayed in different colors. To clarify the configuration of the image division lines L1 to L7 and the building 80, the band areas f1 to f7 are displayed in solid painted form.

In the stage of execution of such automatic profile extraction, the image division lines L1 to L7 may nearly coincide with the profile (ridge line) of the building 80. In this case, corresponding to the instruction by the user, intersections of the image division lines L1 to L7 are calculated, and the model MSO is revised so that these intersections may be peaks.

However, if the boundary of the building 80 and background is unclear or much noise is contained in the band areas f1 to f7, a deviation occurs between the image division lines L1 to L7 and actual profile. In the example in FIG. 5, in particular, the deviation is obvious between the lower side ridge line (boundary line of side SS1 and ground) E4 of the side S81 and the image division line L4. This is because the trees are noise components. The profile extracting system 1 is useful when deviation occurs as in this case.

Figure 6A:
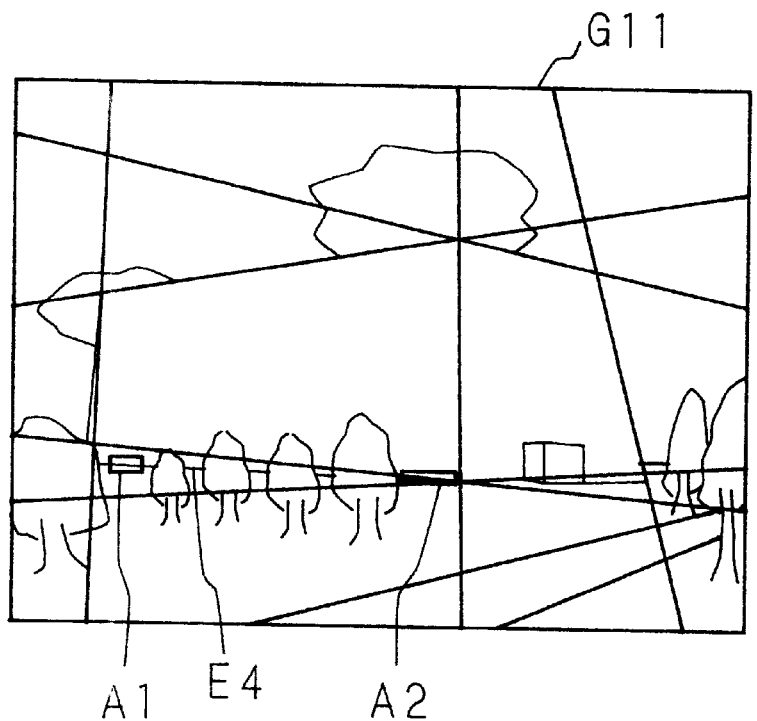
FIGS. 6A, 6B, and 6C are diagrams showing examples of region setting.
Figure 6B:
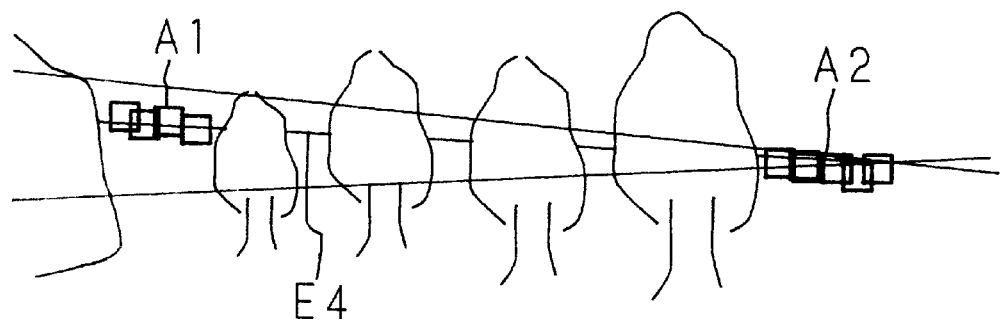
Figure 6C:
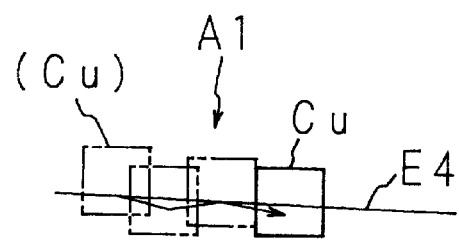

FIG. 6 is a diagram showing an example of area specification. FIG. 6B is an essential magnified view of FIG. 6A, and FIG. 6C is a magnified view of area A1 in FIGS. 6A and 6B. The user specifies areas A1, A2 in which the ridge line E4 is obvious in the original image G11. Only one area may be specified, but by specifying a plurality of areas, the precision of profile extraction is enhanced. As the manipulation for designation of area, as shown in FIG. 6C, the mouse cursor Cu is dragged along the ridge line E4. The trajectory of the mouse cursor Cu from start to end of dragging is the range of area A1 (or A2). The mouse cursor Cu at this time is a square in a size of 11 pixels×11 pixels. The size of the original image G11 is, for example, 240 pixels×320 pixels.

The areas A1, A2 specified by the user are transmitted to the data processing unit 160 through the area storage unit 140 and area connection unit 150 as mentioned above. In the data processing unit 160, first, applying the local operator known in image analysis, the edge intensity t of each pixel of the areas A1, A2 is determined. FIG. 7 is a composition diagram of the operator applied in calculation of edge intensity. Herein, a differential operator composed of 3×3 pixel matrix is used. Supposing pixel values of each pixel to be $g_{ij}$ (i=1, 2, 3, j=1, 2, 3), the edge intensity t of pixel in the center of the matrix is expressed in formula (1).

$$t=(tx^2+ty^2)^{1/2} \qquad (1)$$

$$tx=(g_{13}+g_{23}+g_{33})-(g_{11}+g_{21}+g_{31})$$

$$ty=(g_{31}+g_{32}+g_{33})-(g_{11}+g_{12}+g_{13})$$

Consequently, the data processing unit 160 applies weight w to each pixel of areas A1, A2 depending on its position. FIGS. 5A and 8B are diagrams for explaining the definition of weight of pixels of the image of notice. When only one area A1 is designated as in FIG. 8A, the portion of the area A1 in the original image G11 (the shaded range in the diagram) is the image of notice. When two areas A1, A2 are designated as in FIG. 8B, the combined portion of area A1 and area A2 in the original image G11 is the image of notice. For weighting of the pixels, the least rectangular areas (pixel matrix) F1, F2 including the entire image of notice are assumed.

Fitting the system of coordinates x, y to the screen 31, and supposing the center coordinates of the rectangular areas F1, F2 to be $(x_0, y_0)$, the dimensions in the x-direction and y-direction of rectangular areas F1, F2 (strictly speaking, center distance of pixels at both ends in each direction) are assumed to be W and H, respectively. The weight w (x, y) of the pixel of the coordinates (x, y) is defined in formula (2).

$$w(x, y) = 1 - \left[ \left\{ (x-x_0)\frac{\sqrt{2}}{W} \right\}^2 + \left\{ (y-y_0)\frac{\sqrt{2}}{H} \right\}^2 \right] \qquad (2)$$

That is, being farther from rectangular areas F1, F2, the value of the weight w is smaller. Generally, the end of ridge line is closer to the intersection with other ridge line, and hence the edge intensity t tends to be greater due to effects of other ridge line. Therefore, by setting the value of the weight w of the end smaller, effects of noise components can be reduced. As a result, the precision of assessment of image division line is enhanced.

In this way, the edge intensity t and weight w determined by the data processing unit 160 compose the image data of notice D16 together with the position of pixels, and it is transmitted to the profile extraction unit 170. Since it is noticed from the line kind input unit 120 that the ridge line E4 is a straight line, the straight line equation calculation unit 171 calculates.

The straight line is expressed in formula (3) known as standard form of Hesse.

$$-x \cdot \sin \theta + y \cdot \cos \theta - h = 0 \qquad (3)$$

where h: distance from origin of system of xy coordinates to straight line
θ: angle formed by perpendicular drawn from origin to straight line and x-axis The straight line equation calculation unit 171 gives initial values to parameters h and θ in formula (3), and sets a virtual image division line. At this time, the inclination information of straight line given from the reference information input unit 131 is utilized. Herein, the inclination is specified by the start point and end point of dragging of the mouse cursor Cu when specifying the area A1. However, it is also possible to determine the inclination by comprehensively judging the moving direction of the mouse cursor Cu while dragging.

The distance d from the pixel $(x_1, y_1)$ of the image of notice to the provisional image divisional line is expressed in formula (4).

$$d=|-x_1 \cdot \sin \theta + y_1 \cdot \cos \theta - h| \qquad (4)$$

The straight line equation calculation unit 171 determines the product of the distance d, edge intensity t, and weight w in every pixel of the image of notice, and finds the parameters h, θ for minimizing the total of the obtained product (index of qualification).

$$D = \Sigma(d \times t \times w)$$

Herein, investigating increase or decrease of D by varying the parameters h and θ, sometimes there are plural sets of combination of parameters for minimizing the D. In this embodiment, to shorten the processing time, the first found combination is employed. Therefore, the minimum value of D may not be always the optimum value, but since the initial values of parameters h, θ are set by reference to the inclination information, better results are obtained as compared with the case of not using inclination information.

Figure 9:
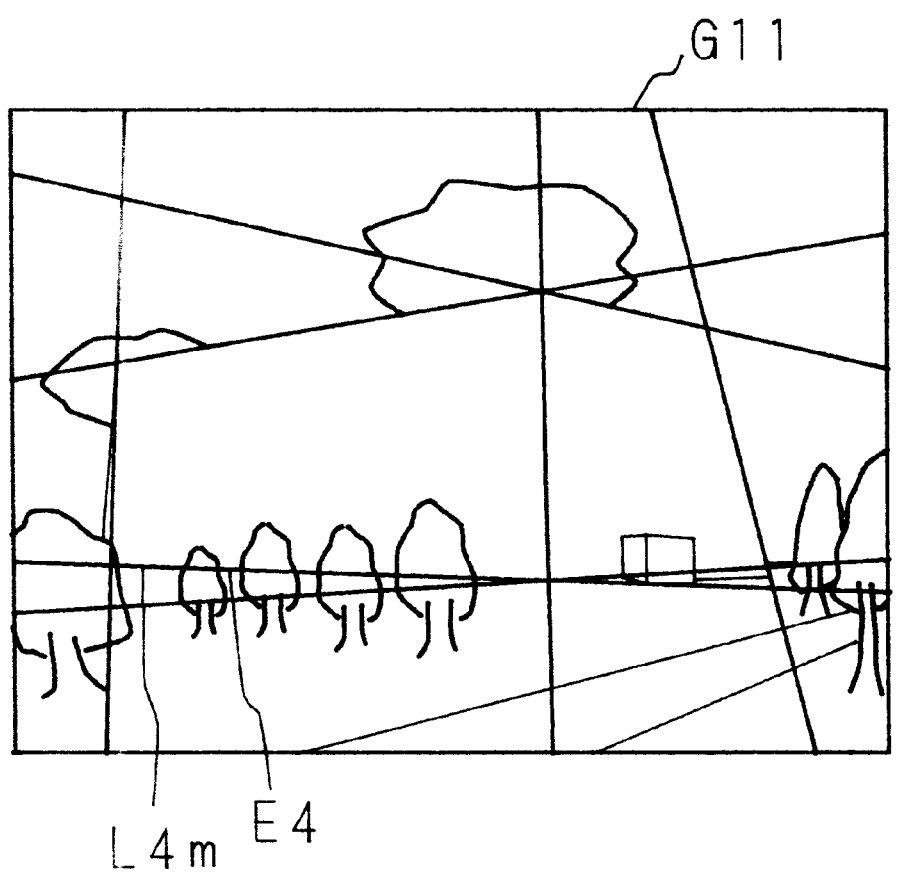
FIG. 9 is a diagram showing the result of profile

The numerical formula of the image division line for minimizing the D is noticed to the result display unit 180. FIG. 9 is a diagram showing the result of profile extraction. As shown in FIG. 9, when the profile is extracted on the basis of the image of notice (areas A1, A2) specified properly by the user, the image division line L4m is matched nearly perfectly with the ridge line E4.

Figure 10:
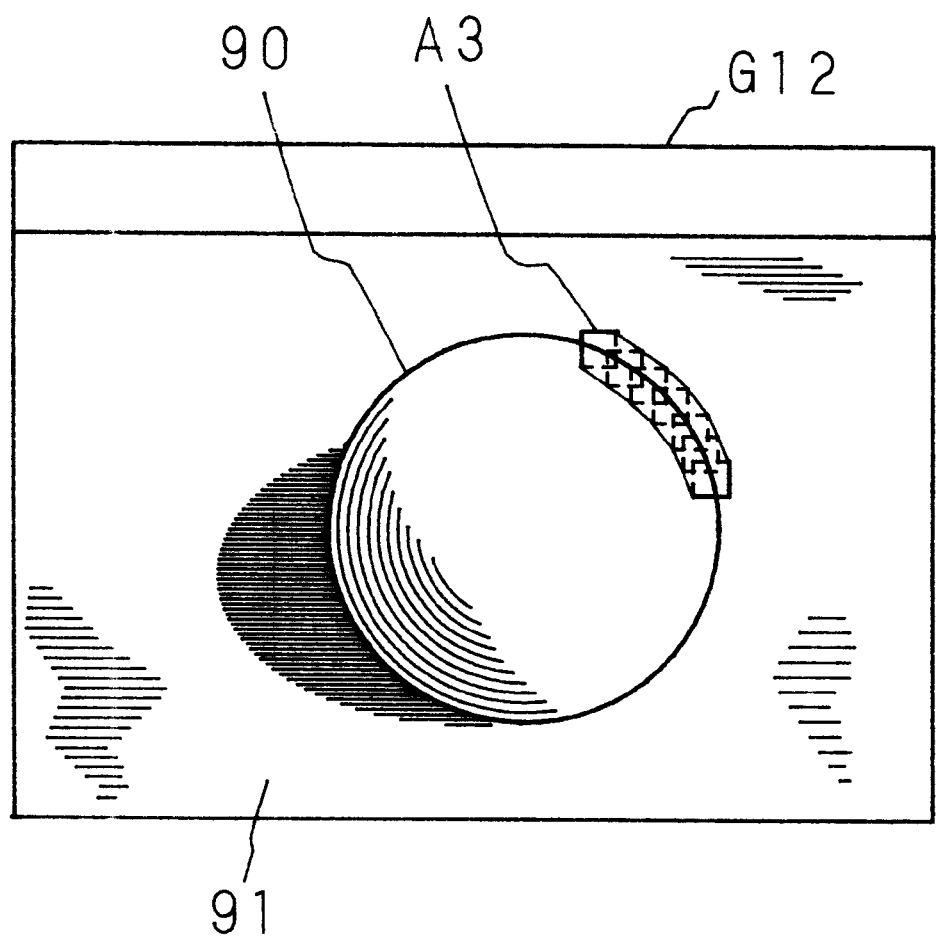
FIG. 10 is a diagram showing another example of region setting.

FIG. 10 is a diagram showing the specified state of the area to be noticed regarding another original image G12. The original image G12 is a photograph taken of a spherical object 90 to be modeled, and is shown on the screen 31. The object 90 is placed on a table 91, and is lit obliquely from above.

As the profile extraction of the object 90, a curve for drawing a circle is specified as the line kind for the image division line. In a manner similar to the case above, on the basis of the generated image data of notice D16 (corresponding to area A3 specified by the user), the image division line (curve) matching with the profile of the object 90 is assessed by the curved line equation calculation unit 172.

The curved line equation calculation unit 172, with the formula of image division line as $$C(x, y) = 0,$$

gives initial values to parameters, and sets a provisional image division line. Supposing the distance d from the pixel $(x_1, y_1)$ of the image of notice to the provisional image division line to be $$d = |C(x_1, y_1)|$$

the product of the distance d, edge intensity t and weight w is determined in every pixel of the image of notice, and the image division line in which the total of the obtained product $$D\Sigma(d \times t \times w)$$

is minimum is found out.

Figure 11:
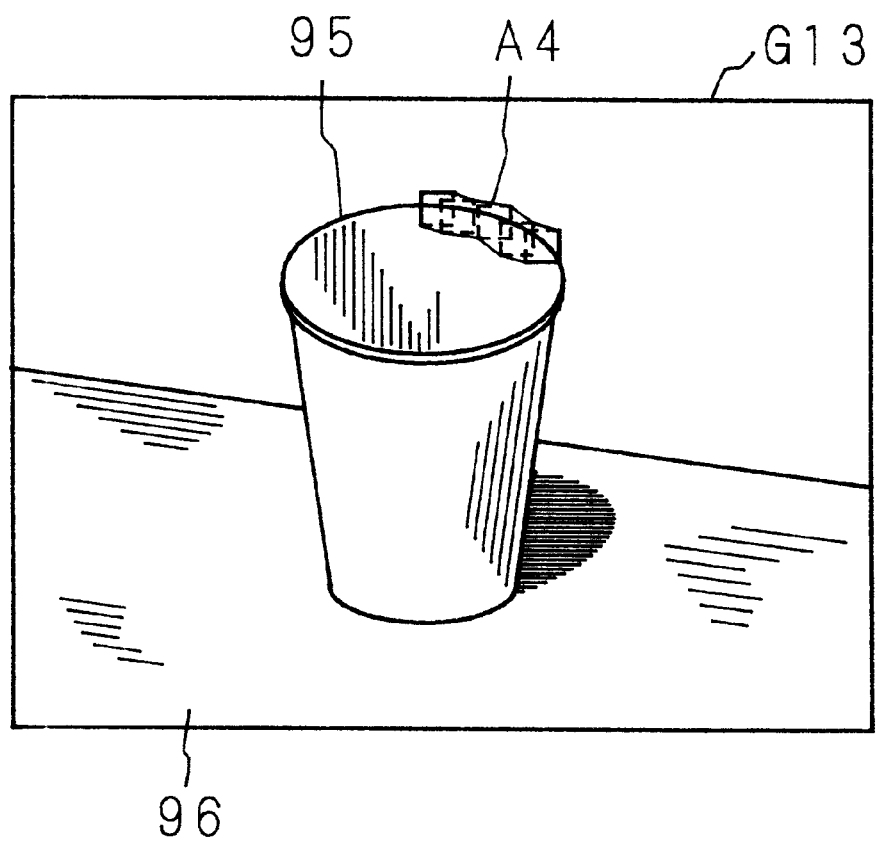
FIG. 11 is a diagram showing a different example of region a setting.

FIG. 11 is a diagram showing the state in which the area to be noticed is specified regarding further different original image G13. The original image G13 is a photograph taken of an object 95 to be modeled, and is displayed on the screen 31. The object 95 is a container (paper cup) in an inverted truncated circular cone with an open top, and is placed on a table 96.

The top profile of the object 95 appearing in the original image G13 is schematically elliptical, but strictly it is not an ellipse because of a perspective difference from the photographic position. Therefore, when a curved line for drawing an ellipse is specified as the line kind of image division line, the image division line matching with the profile in the original image G13 cannot be assessed. However, since it is known that the top profile of the object 95 is circular, by defining the line kind as "a circle in a three-dimensional space," the image division line and the profile in the original image G13 can be matched. Thus, since the projected image of the curved line on the two-dimensionial image is an image division line, the existing line kind can be utilized if the curved line shape is complicated.

Figure 12:
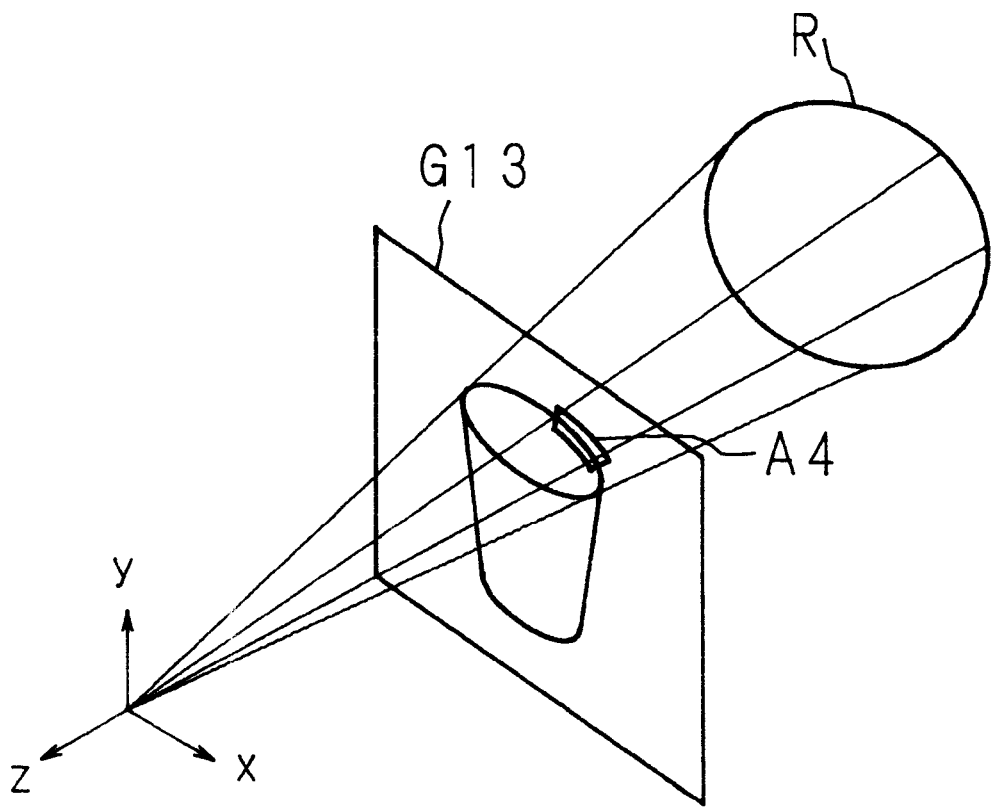
FIG. 12 is a diagram for explaining the function of three-dimensional curve equation calculation unit.

The three-dimensioinal curve equation calculation unit 173, supposing the formula of the image division line (circle) to be $$M(x, y, z) = 0,$$

defines the formula of the projected image of circle R on the original image G13 to be $$C(x, y) = 0$$

when the circle R and original image G13 expressed in the above formula are disposed in a three-dimensional space as shown in FIG. 12. In order to minimize the difference of the profile and projected image indicated by the image data of notice D16 (corresponding to area A4 specified by the user) given from the data processing unit 160, the circle R is modified (rotated, translated, expanded or contracted).

Figure 13:
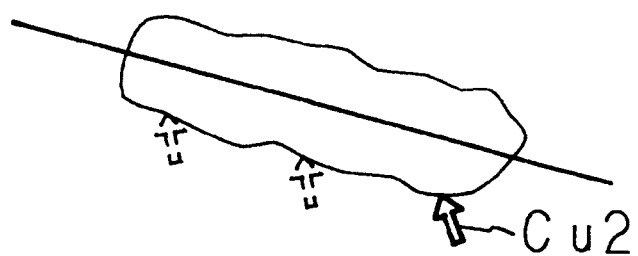
FIG. 13 is a diagram showing an example of method of specifying image of notice.
Figure 14:
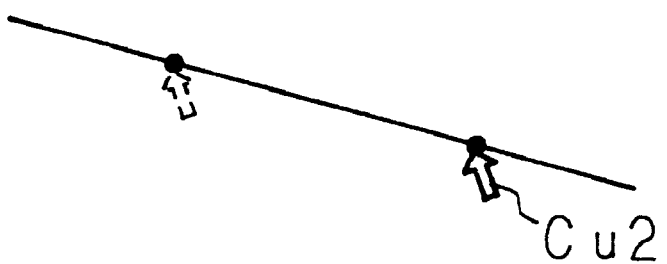
FIG. 14 is a diagram showing an example of method of specifying inclination of straight line.

In the foregoing embodiments, as the method of specifying the area, a relatively large mouse cursor Cu is dragged, but other method may be employed. For example, as shown in FIG. 13, by moving the mouse cursor Cu2 to draw a closed curve, the area enclosed by the closed curve may be regarded as the image of notice. As the method for specifying the inclination of straight line, aside from the area specification, other two points may be specified as shown in FIG. 14. The weighting of pixels in the image of notice is not limited to formula (2), but various changes are possible.

The invention is not limited to modeling of a three-dimensional shape, and may be also applied to various applications for extraction of a partial image of known shape from a two-dimensional image. The object drawn in the image may be either real or virtual.

Thus, according to the invention, the precision of specification of the object shape on the basis of the two-dimensional image can be enhanced. For example, when applied of the modeling system for generating a shape model in an interactive type by making use of a real drawn image of an object, accurate and efficient modeling may be realized.

As the invention may be embodied in several forms without departing from the spirit as essential characteristics thereof, the present embodiments are therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

What is claimed is:

1. A profile extracting method for identifying a shape of an object in a two-dimensional image, comprising the steps of:

extracting an image of notice from the two-dimensional image in an interactive procedure including manual indication of the image of notice, the image of notice including at least a portion of a profile of the object; and identifying, based on a selected line kind and the image of notice, an image division line that matches the profile, the selected line kind being defined by a predetermined function, the predetermined function including one or more parameters and the image division line is defined by the predetermined function in conjunction with parameter values respectively specified for each of the one or more parameters, the image division line identifying step including:

setting a first provisional line by selecting a first value for a setting parameter included in the one or more parameters;

setting a second provisional line by selecting a second value for the setting parameter;

calculating an index of qualification for the image division line in accordance with the image data of notice and the selected line kind, including calculating a first index of qualification value for the first provisional line and a second index of qualification value for the second provisional line; and determining that the image division line substantially matches the profile when the index of qualification satisfies a predetermined condition, including comparing the first index of qualification value and the second index of qualification value, the predetermined condition including the condition that the index of qualification for the line is as close to an optimum value as the index of qualification for any other line of the selected line kind.

2. A profile extracting method of claim 1, wherein a provisional image division line is set, its setting parameter is varied to investigate the index value of its qualification, and the provisional image division line of which index value is closest to the optimum value is assessed as said image division line.

3. The profile extracting method of claim 1, wherein the first provisional line is set in accordance with assessment reference information indicating an extension direction of the profile.

4. The profile extracting method of claim 1, wherein the predetermined function provides a projected image of a curve in three dimensions onto a two-dimensional plane corresponding to the two-dimensional image.

5. The profile extracting method of claim 1, wherein the image of notice includes a set of mutually separate plural partial images.

6. The profile extracting method of claim 1, wherein the predetermined function provides a projected image of a curve in three dimensions onto a two-dimensional plane corresponding to the two-dimensional image.

7. The profile extracting method of claim 1, wherein:
the object shown in the two-dimensional image has a three-dimensional shape; and
the profile included in the image of notice is a projection of a part of the three-dimensional shape onto the two-dimensional image.

8. The profile extracting method of claim 1, wherein the image of notice includes a plurality of pixels selected, in accordance with a user input, to include a subset of pixels representing at least a portion of the profile.

9. The profile extracting method of claim 1, wherein the selected line kind is selected in accordance with an input from a user indicating a line kind selection.

10. A profile extracting method for identifying a shape of an object image as recited in claim 1, further comprising the steps of:
selecting a model primitive corresponding to an object shown in an original image;
displaying the primitive and the original image on a display, the primitive being displayed overlapping the object;
selecting, in accordance with the primitive, at least one first image division line that nearly coincides with a profile of the object; and
the extracting includes extracting an image of notice from the original image in an interactive procedure including manual indication of the image of notice, the image of notice including at least a portion of the profile when the first image division line deviates from the profile.

11. A profile extracting method, comprising the steps of:
extracting an image of notice from the two-dimensional image, the image of notice including at least a portion of a profile of the object; and
identifying, based on a selected line kind and the image of notice, an image division line that matches the profile, the selected line kind being defined by a predetermined function; wherein:
the image of notice includes a plurality of pixels;
the image data of notice includes image information for each of the plurality of pixels; and
for each first pixel and second pixel included in the plurality of pixels, greater weight is accorded to the first pixel than the second pixel for matching the image division line and the profile when the first pixel is closer than the second pixel to a center of the image of notice.

12. A profile extracting method, comprising the steps of:
extracting an image of notice from the two-dimensional image, the image of notice including at least a portion of a profile of the object;
identifying, based on a selected line kind and the image of notice, an image division line that matches the profile, the selected line kind being defined by a predetermined function including one or more parameters and the image division line being defined by the predetermined function in conjunction with parameter values respectively specified for each of the one or more parameters;
wherein the identifying of the image division line includes
setting a first provisional line by selecting a first value for a setting parameter included in the one or more parameters,
setting a second provisional line by selecting a second value for the setting parameter,
calculating an index of qualification for the image division line in accordance with the image data of notice and the selected line kind by calculating a first index of qualification value for the first provisional line and a second index of qualification value for the second provisional line, and
comparing the first index of qualification value and the second index of qualification value to determine that the image division line substantially matches the profile when the index of qualification satisfies a predetermined condition, the predetermined condition including the condition that the index of qualification for the image division line is as close to an optimum value as the index of qualification for any other line of the selected line kind; and
wherein the image of notice includes a plurality of pixels; for each of the pixels the image data of notice includes position data, an edge intensity value, and a weight value; and for each first pixel and second pixel in the plurality of pixels, the weight value of the first pixel exceeds the weight value of the second pixel when a distance between a center of the image of notice and the second pixel exceeds a distance between the center and the first pixel.

13. A profile extracting method, comprising the steps of:
extracting an image of notice from the two-dimensional image, the image of notice including at least a portion of a profile of the object; and
identifying, based on a selected line kind and the image of notice, an image division line that matches the profile, the selected line kind being defined by a predetermined function;

wherein the image of notice includes a plurality of pixels and for each of the pixels the image data of notice includes position data, an edge intensity value based on a difference between pixel values in the image of notice, and a weight value, and wherein for each first pixel and second pixel in the plurality of pixels, the weight value of the first pixel exceeds the weight value of the second pixel when a distance between a center of the image of notice and the second pixel exceeds a distance between the center and the first pixel.

14. A profile extracting system for identifying a shape of an object from a two-dimensional image of the object, comprising:

an area input unit which extracts an image of notice from the two-dimensional image in response to an input instruction, the image of notice including at least a portion of a profile of the object;

a profile extraction unit which selects from a selected line kind an image division line substantially matching the profile in the image of notice, the selected line kind consisting of lines defined by a predetermined function, the profile extraction unit including:

a straight line equation calculation unit which selects the image division line when the predetermined function is a linear equation with two variables corresponding respectively to first and second dimensions of the two-dimensional image;

a curved line equation calculation unit which selects the image division line when the predetermined function is a nonlinear equation with two variables corresponding respectively to the first and second dimensions of the two-dimensional image; and a three-dimensional curve equation calculation unit which selects the image division line when the predetermined function is a nonlinear equation with three variables, two of the three variables corresponding respectively to the first and second dimensions of the two-dimensional image; and a result display unit displaying the selected image division line by overlapping the image division line with the two-dimensional image, wherein the image of notice includes a plurality of pixels, and further comprising a data processing unit that generates image data of notice, for each of the plurality of pixels the image data of notice including position information, edge intensity information based on a difference between pixel values in the image of notice, and weight information, and wherein the data processing unit includes a weight calculation unit that generates a weight value included in the weight information for each of the plurality of pixels, the weight value for each first pixel in the plurality of pixels exceeding the weight value for each second pixel in the plurality of pixels when the first pixel is closer than the second pixel to a center of the image of notice.

15. A computer-readable medium encoded with a program for executing profile extraction operations, said program comprising the functions of:

extracting an image of notice from a two-dimensional image in an interactive procedure including manual indication of the image of notice, the image of notice including at least a portion of a profile of a three-dimensional object; and selecting an image division line within the image of notice which matches the profile, the image division line being of a selected line kind determined by a predetermined function based on the shape of the image of notice, the predetermined function including one or more parameters, the image division line is defined by the predetermined function in conjunction with parameters value respectively specified for each of the one or more parameters, and the image division line selecting function includes the functions of:

setting a first provisional line by selecting a first value for a setting parameter included in the one or more parameters; and setting a second provisional line by selecting a second value for the setting parameter;

calculating an index of qualification for the image division line in accordance with the image data of notice and the selected line kind, including calculating a first index of qualification value for the first provisional line and a second index of qualification value for the second provisional line; and determining that the image division line substantially matches the profile when the index of qualification satisfies a predetermined condition, including comparing the first index of qualification value and the second index of qualification value, the predetermined condition including the condition that the index of qualification for the image division line is as close to an optimum value as the index of qualification for any other line of the selected line kind.

* * * * *